United States Patent [19]

Lawroski

[11] Patent Number: 5,318,479
[45] Date of Patent: Jun. 7, 1994

[54] VACUUM CLEANER BELT INSTALLATION TOOL

[76] Inventor: George Lawroski, 23208 Raven, Eastpointe, Mich. 48021

[21] Appl. No.: 77,430

[22] Filed: Jun. 15, 1993

[51] Int. Cl.⁵ ............................................. F16H 7/24
[52] U.S. Cl. .................................................. 474/130
[58] Field of Search .............. 474/101, 113, 119, 121, 474/122, 130

[56] References Cited

U.S. PATENT DOCUMENTS

| | | | |
|---|---|---|---|
| 1,666,789 | 4/1928 | Pobanz | 474/130 |
| 2,121,129 | 6/1938 | Malone | 474/130 |
| 2,418,337 | 4/1947 | Davis | 474/130 |
| 2,465,217 | 3/1949 | Fleming | 474/130 |
| 2,505,216 | 4/1950 | Simmons et al. | 474/130 |
| 2,621,529 | 12/1952 | Hawkins | 474/130 |

Primary Examiner—Thuy M. Bui
Attorney, Agent, or Firm—Barnes, Kisselle, Raisch, Choate, Whittemore & Hulbert

[57] ABSTRACT

An installation tool for vacuum cleaners having a rotary brush and a motor drive shaft in which a tensioned belt is used between the brush and the motor shaft. The tool has a straight shaft portion with a handle at a proximal end and a hook at a distal end. A carrier portion is formed between the straight shaft portion and the hook to capture a loop of the elastic belt. The hook is located in a belt groove on the motor drive shaft while the belt inserted in the tool. The handle is then raised and rotated to move the belt over the hook and into the belt groove.

14 Claims, 1 Drawing Sheet

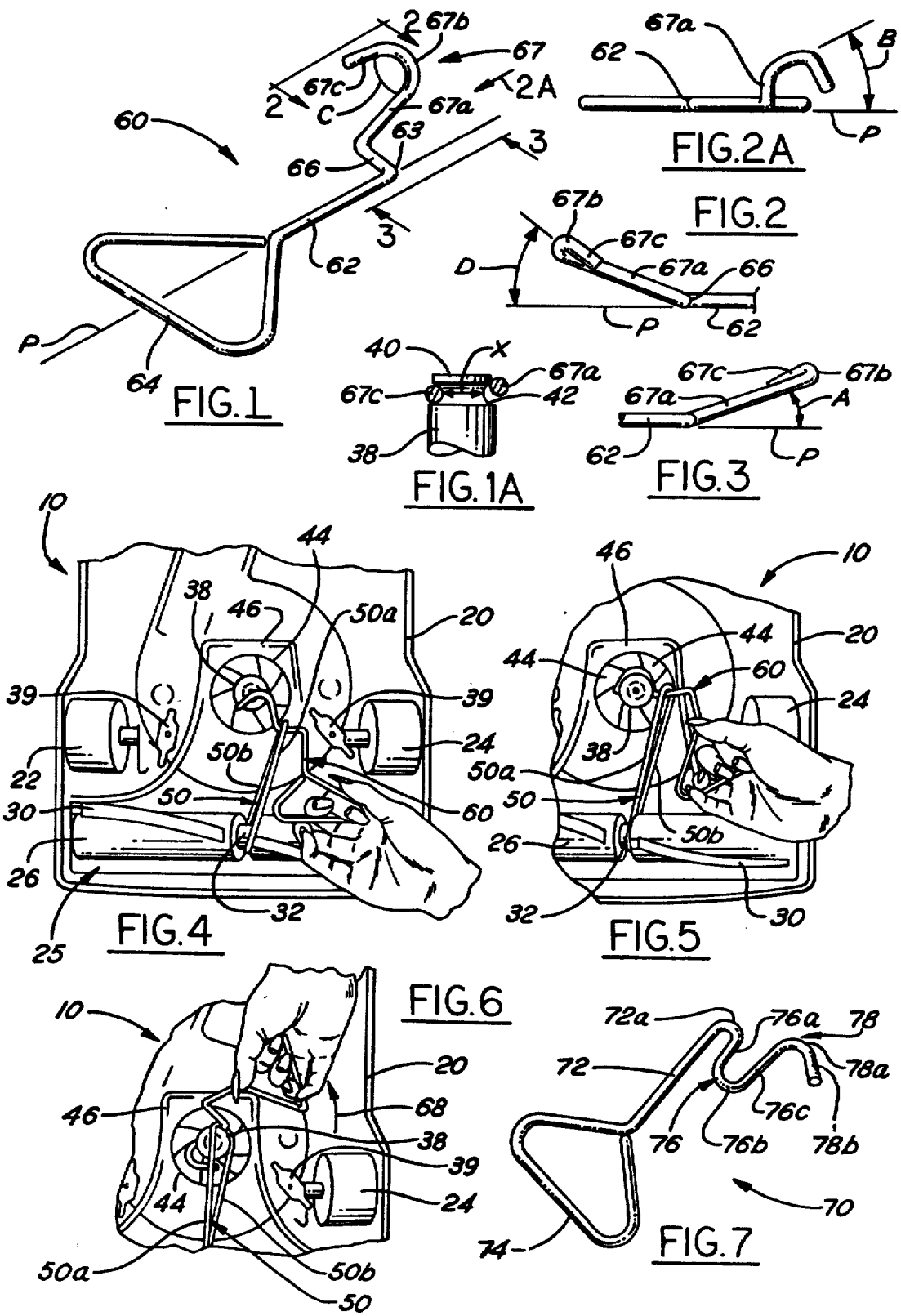

VACUUM CLEANER BELT INSTALLATION TOOL

FIELD OF THE INVENTION

This invention relates to vacuum cleaners, and more particularly to a tool to assist in installing the belt for driving the rotary brush of a vacuum cleaner.

BACKGROUND OF THE INVENTION

Many household vacuum cleaners have a rotary brush driven by an electric motor through an O-ring type belt encircling the brush and received on a pulley connected to the drive shaft of the motor. Manufacturers of vacuum cleaners often recommend changing the belts twice a year. The elastic belt is under considerable tension and it is difficult for the average person to install the elastic belt on the shaft. The difficulty in installing a new belt often necessitates seeking a professional repair service at great inconvenience and expense to the user.

Various tools are known, mainly in the automotive field, for applying a drive belt to a pulley. One such tool is disclosed in U.S. Pat. No. 2,505,216 which describes a tool for installing a fan belt to drive a cooling fan of an automobile engine. The tool has a shoulder to engage a flange of a pulley as the belt rests on the head of the tool. The tool is then moved along the edge of the flange until the belt slips into the pulley groove.

Another tool is disclosed in U.S. Pat. No. 2,621,529 which describes a tool for removing and applying fan belts for automobiles. The tool has a long limb to be seated in the groove of the pulley as the belt rests on the short limb. The tool is then rocked and manipulated step by step to stretch the belt onto the pulley.

However, these prior devices are not adapted for safely applying a drive belt to a vacuum cleaner because neither tool can securely remain in the belt groove of a vacuum cleaner drive shaft while applying the belt resulting in possible injury to the user's fingers.

SUMMARY OF THE INVENTION

A belt installation tool is provided which is preferably a one-piece elongate member with a hook at one end for engaging a drive pulley which merges into a carrier portion slidably receiving a loop of the belt which merges into an extension connected to a handle at the other end of the tool for manually manipulating it. In use, a belt is looped over the brush and the carrier of the tool which is manipulated to engage the hook with the groove of the pulley and generally arcuately move the carrier around the pulley to tension the belt and dispose it in the groove of the pulley.

Objects, features and advantages of this invention are to provide an O-ring belt installation tool which can be easily and readily utilized by unskilled persons, eliminates the need to use fingers or makeshift tools to directly engage and tension the belt and dispose it in the groove of the drive pulley, greatly reduces and substantially eliminates the risk of injury to the fingers of the installer, and is rugged, durable, reliable, and of relatively simple design, economical manufacture and has a long useful life in service.

BRIEF DESCRIPTION OF THE DRAWINGS

DRAWINGS accompany the disclosure and the various views thereof may be briefly described as:

FIG. 1 is a perspective view of the installation tool.

FIG. 1A is a cross-sectional view of the installation tool positioned in a groove of a drive shaft of a vacuum cleaner.

FIG. 2 is a fragmentary side view taken generally along line 2—2 in FIG. 1.

FIG. 2A is an end view taken generally in the direction of line 2A in FIG. 1.

FIG. 3 is a fragmentary side view taken generally along the line 3—3 in FIG. 1.

FIG. 4 is a fragmentary bottom view of a vacuum cleaner with the belt received on the installation tool.

FIG. 5 is a fragmentary bottom view similar to FIG. 4 and showing the tool positioned on the drive shaft.

FIG. 6 is a fragmentary bottom view similar to FIG. 4 and showing the belt being applied by the tool to the drive shaft.

FIG. 7 is a perspective view of another embodiment of the installation tool.

DETAILED DESCRIPTION

With reference to the drawings, FIGS. 4–6 illustrate a vacuum cleaner 10 with a frame 20 having spaced apart carpet engaging support rollers 22 and 24. At the forward portion of the frame 20 is a rotary brush 25 with a cylindrical body 26 journalled for rotation by bearings (not shown) at each end. The body 26 has bristles 30 mounted in a spiral configuration to contact the carpet being cleaned. The center of the body 26 has a belt groove 32.

An electric motor (not shown) is mounted within the vacuum cleaner housing 20 and has an outwardly projecting drive shaft 38 with a pulley 40 thereon having a belt groove 42 (FIG. 1A). The shaft 38 projects through an air inlet opening or aperture 44 in the vacuum cleaner housing 20 and a curved shroud 46 which has wings extending to each side of the frame 20 surrounds the aperture 44. Normally, a bottom cover (not shown) is retained on the shroud 46 by clips 39 to cover only the drive shaft 38 and the aperture 44 leaving the brush uncovered so that the bristles 30 engage the carpet. Access to the drive shaft 38 is obtained by removing the cover. The brush is driven by the motor through a belt 50 (shown in the untensioned position in FIG. 4), received in the groove 42 of the pulley 40 and around the brush body 26 and in its groove 32. To facilitate installation and removal of the belt over the brush, it is removably mounted and received in the frame 20 of the vacuum cleaner.

FIGS. 1–3 illustrate a preferred belt tool 60 embodying this invention. Preferably, the tool is made as a one-piece elongate member or rod of a rigid material such as steel or plastic with a diameter of about 0.15 to 0.3 of an inch. As shown in FIG. 1, tool 60 has a relatively straight shaft portion 62 which terminates in a proximal generally triangular handle 64. The straight shaft 62 has a right angle bend 63 that merges into an extension 66 which forms a carrier terminating in a hook 67. The handle 64, shaft 62 and extension 66 define a plane P and the hook 67 has a first leg 67a extending generally longitudinally and bent at an upward acute included angle A (FIG. 3) in the range of 15°–25°, but preferably at about 20°, with respect to the plane P of the handle 74. The first leg 67a merges into a curved head with a return bend portion 67b that tapers upwardly away from the plane P extending at an angle B (FIG. 2A) in the range of 20°–30°, but preferably at about 28°. The portion 67b ends in a second leg 67c extending downward toward the plane P at an acute included angle D (FIG. 2) in the range of 20°-30°, but preferably at about 25°. The first and second legs 67a,67c form an acute included angle C (FIG. 1) in the range of 40°-45°, but preferably at about 41°.

Starting with FIG. 4, the progression of the belt installation is illustrated. The belt 50 is disposed in the groove 32 of the roller body 26 and the hook 67 of the tool 60 is inserted through the belt 50 while twisted for disposition into proper drive orientation so that the loop is received on the extension 66 forming the carrier of the hook. As shown in FIG. 5, the hook 67 is placed over the end of the shaft 38 and into the groove 42 of the pulley 40. As illustrated, preferably three middle fingers of the operator are positioned within the handle 64 as the thumb and little finger engage the outside of the handle 64. To tension the belt, handle 64 of the tool 60 is initially rotated and rises as the leg 67c and curved portion 67b of the hook 67 engage and slide in the belt groove 42 of the pulley 40. The leg 67c is substantially straight which allows it to remain within the belt groove 42 as the tool 60 is rotated. The distance between the legs 67a, 67c is greater than the distance X (FIG. 1A) from the inside surface of the belt groove 42 to the outside surface of the drive shaft 38, and the angular configuration of the hook 67 is constructed so that when the leg 67c engages the belt groove 42, the leg 67a projects out of the belt groove 42 (FIG. 1A) and the carrier portion 66 projects above and away from the drive shaft 38 to avoid interference with the drive shaft during installation of the belt.

To dispose the belt 50 in the belt groove 42 as shown in FIG. 6, the handle 64 is moved in a generally spiral path 68 both upward and radially inward so that the top run 50a of the belt 50 slips over the top of the drive shaft 38 and the bottom run 50b of the belt 50 drops into the belt groove 42 of the pulley 40 on the drive shaft 38. As the tool 60 is further rotated to extend substantially perpendicular to the belt 50, the return bend 67b and second leg 67c slightly disengage from the groove 42 and the first leg 67a slides therein (FIG. 6). In this position, the hook 67 extends between the upper and lower runs 50a,50b of the belt 50. Continued rotation of the tool 60 causes the belt 50 to progressively engage the groove 42 as the leg 67a is forced from the groove 42 by the belt 50. Thereafter, the tool 60 disengages from the belt 50 and the groove 42 and is removed from between the top and bottom runs 50a,50b of the belt 50 and the vacuum cleaner.

The shape of the handle 64 allows control of the tool 60 to prevent the tension induced by the stretching of the belt 50 from torquing the tool 60 and causing it to slip off the drive shaft 38. The angular position of the leg 67c relative to the plane of the shaft 62 and carrier 66 (FIG. 2) is formed so that it will remain within the belt groove 42 as the tool 60 is rotated.

FIG. 7 shows another embodiment of a tool 70 having a straight shaft portion 72 and a handle 74. The shaft portion 72 is bent at 72a into a double reverse bend 76 forming a carrier portion for the belt 50 having a first leg 76a, a curved portion 76b and a leg 76c forming a substantially S-shape so that the belt 50 is carried by the lower leg 76a of the carrier 76. A hook portion 78 extends from the carrier portion 76 and has a curved portion 78a and a leg 78b extending outwardly and away from the carrier portion 76.

The handle 74, shaft 72, first leg 76a and curved portion 76b define a plane. The second leg 76c is angled from the plane in the same manner as leg 67a in the embodiment of FIGS. 1-6. The curved portion 78a and leg 78b are angularly formed similar to the bend portion 67b and leg 67c of the aforementioned embodiment but extend in the opposite direction. Installation of the belt is essentially the same as described with reference to the embodiment of FIGS. 1-3. The upper loop or free end of the belt 50 is received on the leg 76c of the carrier 76 and the hook portion 78 is placed in the belt groove 42 on the drive shaft 40. The handle 74 is then rotated in an arcuate path toward the leg 78a and radially inwardly to allow the upper run of the belt 50 to slip over the drive shaft 40 and drop into the belt groove 42. The tool is further rotated to extend substantially perpendicular to the belt 50 so that the leg 78b and curved portion 78a slightly disengage from the belt groove 42 as the leg 76c becomes positioned therein. The hook 78 now extends between the upper and lower runs 50a,50b of the belt 50. The belt 50 progressively engages the belt groove 42 as previously described as the leg 76c is formed from the belt groove by the belt. The tool is then removed from between the upper and lower runs 50a,50b of the belt 50.

I claim:

1. A belt installation tool for installing an endless belt on a vacuum cleaner having a rotary brush and a grooved drive shaft, such that, when installed, the belt extends around the brush forming an upper and lower run and extends around and in the drive shaft groove, said tool comprising an elongate body having a handle at one end having an axis, a carrier portion integral with the handle and formed at an angle thereto for engaging and moving the upper run of a free loop of the belt over the drive shaft and into a groove therein, and a hook having a first leg, a curved portion and a free end integral with the carrier portion arranged and constructed such that when the free end and the curved portion engage the drive shaft groove, the first leg is positioned out of the drive shaft groove so that the handle extends axially away from the drive shaft and as the handle is rotated toward the free end of said hook, the first leg engages the drive shaft groove to force the lower run of the belt into the drive shaft groove as the upper run of the belt is moved over the drive shaft and drops into the drive shaft groove as the first leg of said hook is forced by the belt from the drive shaft groove and is removed from between the upper and lower runs of the belt.

2. The belt installation tool as in claim 1 wherein said body is bent at a substantially right angle to form said carrier portion.

3. The belt installation tool as in claim 2 wherein the handle and said carrier portion define a plane of the tool and the first leg of said hook is bent at substantially a right angle from said carrier portion and is formed at an acute angle with respect to the plane.

4. The belt installation tool as in claim 3 wherein the first leg is formed at an acute angle in the range of 15°-25°.

5. The belt installation tool as in claim 4 wherein the first leg is formed at an angle of approximately 20° from the plane of the tool.

6. The belt installation tool as in claim 3 wherein the curved portion is formed at an acute angle with respect to the plane of the tool in the range of 20°-30°.

7. The belt installation tool as in claim 6 wherein the curved portion is formed at an acute angle of approximately 28°.

8. The belt installation tool as in claim 3 wherein the free end is formed at an acute angle with respect to the plane of the tool in the range of 20°-30°.

9. The belt installation tool as in claim 8 wherein the free end is formed at an acute angle of approximately 25°.

10. The belt installation tool of claim 1 wherein the first leg and the free end form an acute angle in the range of 40°-45°.

11. The belt installation tool of claim 10 wherein the first leg and the free end form an angle of about 41°.

12. The belt installation tool as in claim 1 wherein the tool is made of rigid material having a diameter in the range of 0.2-0.3 inches.

13. The belt installation tool as in claim 12 wherein the tool is made of plastic.

14. The belt installation tool as in claim 12 wherein the tool is made of steel.

* * * * *